(12) United States Patent
Keller et al.

(10) Patent No.: US 10,963,610 B1
(45) Date of Patent: Mar. 30, 2021

(54) ANALYZING CLOCK JITTER USING DELAY CALCULATION ENGINE

(71) Applicant: Cadence Design Systems, Inc., San Jose, CA (US)

(72) Inventors: Igor Keller, Pleasanton, CA (US); Vishnu Kumar, Noida (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/881,908

(22) Filed: May 22, 2020

(51) Int. Cl.
| G06F 17/50 | (2006.01) |
| G06F 30/3315 | (2020.01) |
| G06F 119/06 | (2020.01) |
| G06F 119/12 | (2020.01) |
| G06F 30/398 | (2020.01) |
| G06F 30/367 | (2020.01) |
| G06F 30/3312 | (2020.01) |

(52) U.S. Cl.
CPC ...... *G06F 30/3315* (2020.01); *G06F 30/3312* (2020.01); *G06F 30/367* (2020.01); *G06F 30/398* (2020.01); *G06F 2119/06* (2020.01); *G06F 2119/12* (2020.01)

(58) Field of Classification Search
CPC ............. G06F 30/3315; G06F 30/3312; G06F 30/367; G06F 30/398; G06F 2119/06; G06F 2119/12
USPC ........... 716/115, 113, 108, 134, 136; 703/16
See application file for complete search history.

(56) References Cited

U.S. PATENT DOCUMENTS

| 6,118,304 | A | * | 9/2000 | Potter | G06F 7/49 326/93 |
| 6,233,707 | B1 | * | 5/2001 | Potter | G06F 7/49 714/724 |
| 6,288,589 | B1 | * | 9/2001 | Potter | G06F 5/015 327/295 |
| 7,039,891 | B2 | * | 5/2006 | Tetelbaum | G06F 30/392 716/113 |
| 7,890,904 | B2 | * | 2/2011 | Murgai | G06F 30/30 716/113 |
| 8,904,331 | B1 | * | 12/2014 | Fung | G06F 30/367 716/115 |
| 9,275,178 | B1 | * | 3/2016 | Fung | G06F 30/3312 |
| 10,430,536 | B1 | | 10/2019 | Keller et al. | |
| 2006/0236280 | A1 | * | 10/2006 | Homma | G06F 30/3312 716/108 |
| 2006/0247906 | A1 | * | 11/2006 | Austin | G06F 30/3312 703/16 |
| 2006/0288320 | A1 | * | 12/2006 | Murgai | G06F 30/30 716/104 |
| 2010/0083205 | A1 | * | 4/2010 | Ono | G06F 30/3312 716/113 |
| 2012/0278056 | A1 | * | 11/2012 | Yi | G06F 11/261 703/14 |

* cited by examiner

*Primary Examiner* — Phallaka Kik
(74) *Attorney, Agent, or Firm* — Foley & Lardner LLP

(57) ABSTRACT

The present embodiments are generally directed to analyzing clock jitter. Jitter affects the clock delay of the circuit and the time the clock is available at sync points, so it is important to calculate its impact correctly to take appropriate margin during timing analysis. Jitter could be due to various reasons—one of them is due to IR Impact on the Clock Tree. IR drop variations between the two consecutive cycles can effectively reduce the available clock period for data to be correctly captured.

20 Claims, 9 Drawing Sheets

| AINST_NAME | START_TIME | :END_TIME | EIV_AVG | | | | | | |
|---|---|---|---|---|---|---|---|---|---|
| udisp/ulsdp0/U1 | 1e-09 | :2e-09 | 0.511 | 3e-09 | :4e-09 | 0.511 | 5e-09 | :6e-09 | 0.573 7e-09:8e-09 0.562 9e-09:1e-08 0.559 |
| udisp/ulsdp0/U2 | 1e-09 | :2e-09 | 0.57 | 3e-09 | :4e-09 | 0.586 | 5e-09 | :6e-09 | 0.596 7e-09:8e-09 0.544 9e-09:1e-08 0.59 |
| udisp/ulsdp0/U3 | 1e-09 | :2e-09 | 0.538 | 3e-09 | :4e-09 | 0.501 | 5e-09 | :6e-09 | 0.543 7e-09:8e-09 0.538 9e-09:1e-08 0.58 |
| udisp/ulsdp0/U4 | 1e-09 | :2e-09 | 0.521 | 3e-09 | :4e-09 | 0.556 | 5e-09 | :6e-09 | 0.555 7e-09:8e-09 0.532 9e-09:1e-08 0.518 |
| udisp/ulsdp0/U5 | 1e-09 | :2e-09 | 0.547 | 3e-09 | :4e-09 | 0.531 | 5e-09 | :6e-09 | 0.548 7e-09:8e-09 0.575 9e-09:1e-08 0.546 |
| udisp/ulsdp0/U6 | 1e-09 | :2e-09 | 0.543 | 3e-09 | :4e-09 | 0.506 | 5e-09 | :6e-09 | 0.589 7e-09:8e-09 0.595 9e-09:1e-08 0.569 |
| udisp/ulsdp0/U11 | 1e-09 | :2e-09 | 0.509 | 3e-09 | :4e-09 | 0.523 | 5e-09 | :6e-09 | 0.596 7e-09:8e-09 0.563 9e-09:1e-08 0.556 |
| udisp/ulsdp0/U12 | 1e-09 | :2e-09 | 0.538 | 3e-09 | :4e-09 | 0.555 | 5e-09 | :6e-09 | 0.52 7e-09:8e-09 0.514 9e-09:1e-08 0.553 |
| udisp/ulsdp0/U25 | 1e-09 | :2e-09 | 0.505 | 3e-09 | :4e-09 | 0.57 | 5e-09 | :6e-09 | 0.538 7e-09:8e-09 0.526 9e-09:1e-08 0.548 |
| udisp/ulsdp0/U28 | 1e-09 | :2e-09 | 0.507 | 3e-09 | :4e-09 | 0.506 | 5e-09 | :6e-09 | 0.574 7e-09:8e-09 0.517 9e-09:1e-08 0.576 |
| udisp/ulsdp0/U34 | 1e-09 | :2e-09 | 0.581 | 3e-09 | :4e-09 | 0.586 | 5e-09 | :6e-09 | 0.511 7e-09:8e-09 0.525 9e-09:1e-08 0.524 |
| udisp/ulsdp0/U36 | 1e-09 | :2e-09 | 0.515 | 3e-09 | :4e-09 | 0.578 | 5e-09 | :6e-09 | 0.592 7e-09:8e-09 0.574 9e-09:1e-08 0.59 |
| udisp/ulsdp0/U37 | 1e-09 | :2e-09 | 0.511 | 3e-09 | :4e-09 | 0.532 | 5e-09 | :6e-09 | 0.586 7e-09:8e-09 0.522 9e-09:1e-08 0.556 |
| udisp/ulsdp0/U39 | 1e-09 | :2e-09 | 0.579 | 3e-09 | :4e-09 | 0.567 | 5e-09 | :6e-09 | 0.519 7e-09:8e-09 0.567 9e-09:1e-08 0.518 |
| udisp/ulsdp0/U40 | 1e-09 | :2e-09 | 0.578 | 3e-09 | :4e-09 | 0.553 | 5e-09 | :6e-09 | 0.56 7e-09:8e-09 0.565 9e-09:1e-08 0.571 |
| udisp/ulsdp0/U45 | 1e-09 | :2e-09 | 0.528 | 3e-09 | :4e-09 | 0.594 | 5e-09 | :6e-09 | 0.549 7e-09:8e-09 0.507 9e-09:1e-08 0.541 |

Fig. 4

500 JITTER SUMMARY

510

| 512 | 514 | 516 |
|---|---|---|
| Clock Name | Cycle-To-Cycle Jitter (Type) | Total End Points |
| ck_gclkcr | -9.93e-11 - 1.19e-10 (F) | 2282 |
| ck_gclkcr | -9.99e-11 - 8.89e-11 (R) | 2282 |

JITTER PER ENDPOINT

520

| 522 | 524 | 526 | 528 |
|---|---|---|---|
| Clock | End Points | Adj Cycles for Max -ve/+ve Change in Jitter | Cycle-To-Cycle Jitter |
| ck_gclkcr | urst/clk_gate_mb3_rst_ptr_dec_s4q_reg/latch/CP (R) | (2, 3) - (1, 2) | -6.9e-11 - 8.89e-11 |
| ck_gclkcr | urst/clk_gate_n_mb_12_wr_rst_ptr_w1_reg/latch/CP (R) | (2, 3) - (1, 2) | -6.87e-11 - 8.88e-11 |
| ck_gclkcr | urst/urstentry1/urststate/clk_gate_state_raw_reg/latch/CP (R) | (2, 3) - (1, 2) | -6.88e-11 - 8.82e-11 |
| ck_gclkcr | ufe/clk_gate_rst_req_el_reg/latch/CP (R) | (2, 3) - (1, 2) | -6.38e-11 - 8.79e-11 |
| ck_gclkcr | urst/clk_gate_mb4_rst_ptr_dec_s4q_reg/latch/CP (R) | (2, 3) - (1, 2) | -6.82e-11 - 8.74e-11 |
| ck_gclkcr | umon/clk_gate_strex_fail_cnt_reg/latch/CP (R) | (2, 3) - (1, 2) | -6.79e-11 - 8.6e-11 |
| ck_gclkcr | urst/clk_gate_mb5_rst_ptr_dec_s4q_reg/latch/CP (R) | (2, 3) - (1, 2) | -6.68e-11 - 8.59e-11 |
| ck_gclkcr | urst/clk_gate_mb0_rst_ptr_dec_s4q_reg/latch/CP (R) | (2, 3) - (1, 2) | -6.26e-11 - 8.56e-11 |
| ck_gclkcr | urst/clk_gate_mb1_rst_ptr_dec_s4q_reg/latch/CP (R) | (2, 3) - (1, 2) | -6.71e-11 - 8.43e-11 |
| ck_gclkcr | urst/clk_gate_mb2_rst_ptr_dec_s4q_reg/latch/CP (R) | (2, 3) - (1, 2) | -6.32e-11 - 8.31e-11 |
| ck_gclkcr | umon/ls_clrexmon_reg/CP (R) | (2, 3) - (1, 2) | -5.29e-11 - 8.11e-11 |
| ck_gclkcr | urst/mb_valid_s3_reg_3_2_/CP (R) | (2, 3) - (1, 2) | -7.42e-11 - 8.05e-11 |
| ck_gclkcr | urst/rst_fline_l2_wr_mb_ptr_w0_reg_2_1_/CP (R) | (2, 3) - (1, 2) | -7.53e-11 - 7.83e-11 |
| ck_gclkcr | urst/mb_timeout_reg_5_4_/CP (R) | (2, 3) - (1, 2) | -6.99e-11 - 7.79e-11 |
| ck_gclkcr | urst/mb_valid_s4_reg_3_2_/CP (R) | (2, 3) - (1, 2) | -7.63e-11 - 7.7e-11 |
| ck_gclkcr | urst/mb_stream_timeout_q_reg/CP (R) | (2, 3) - (1, 2) | -7.6e-11 - 7.7e-11 |
| ck_gclkcr | urst/mb_available_s5_reg/CP (R) | (2, 3) - (1, 2) | -7.21e-11 - 7.69e-11 |
| ck_gclkcr | uctl/clk_gate_vttbr_q_reg/latch/CP (R) | (3, 4) - (1, 2) | -4e-11 - 7.69e-11 |
| ck_gclkcr | urst/any_evict_merge_e4_reg/CP (R) | (2, 3) - (1, 2) | -7.85e-11 - 7.68e-11 |
| ck_gclkcr | urb/sx_resp_tag_vld_kw2_reg/CP (R) | (2, 3) - (3, 4) | -4.09e-11 - 7.67e-11 |
| ck_gclkcr | uissq/ls_credit_reg_1_/CP (R) | (2, 3) - (3, 4) | -3.45e-11 - 7.67e-11 |
| ck_gclkcr | ufb/rst_fb_break_stream_del_reg/CP (R) | (2, 3) - (1, 2) | -5.95e-11 - 7.63e-11 |

*set number

Fig. 5

ANALYZING CLOCK JITTER USING DELAY CALCULATION ENGINE

TECHNICAL FIELD

The present embodiments relate generally to timing analysis, and more particularly to analyzing clock jitter using a delay calculation engine.

BACKGROUND

Integrated circuit (IC) designs (e.g., designs for application specific integrated circuits (ASICs) or systems on a chip (SOCs)) are increasingly complex, sometimes involving millions of elements, shapes or geometries, and may be facilitated with an electronic design automation (EDA) tool that allows a designer to interactively position ("place") and connect ("route") various shapes on the circuit. The EDA tool then creates a circuit layout containing the physical locations and dimensions of the circuit's components, interconnections, and various layers from the original design that may then be fabricated, creating the IC. As is well known in the art, the designed IC can eventually be fabricated by transferring or printing the circuit layout to a semiconductor substrate in a series of layers that collectively will form the features that constitute the devices that make up the components of the integrated circuit.

After or during the design and creation of an IC layout, validation, optimization, and verification operations are performed on the IC layout using a set of testing, simulation, analysis and validation tools. These operations are conventionally performed in part to detect and correct placement, connectivity, and timing errors. For example, as part of the verification, the IC layout may undergo circuit simulation and analysis where the signals between components are tested, for example using static timing analysis (STA) or gate level simulation (GLS).

Timing analyses utilize timing models that provide, for example, timing information (e.g., timing attributes, timing constraints, etc.) and/or other description (e.g., cell description, bus description, environment description, etc.) for electronic design components in the design. Standard library timing models often employed in this regard include, for example, Liberty format specified .lib library models for defining the delays of standard digital gates (AND, OR, NOT, FLOP, LATCH etc.).

Library models for analyzing timing of standard electronic components (e.g. standard cells) can be obtained from a foundry or IP provider. These timing models can be acceptable in a number of scenarios, including designs at larger process nodes, such as 90 nm or larger, designs that do not require high speeds or performance, and/or designs operating either at or higher than three times the transistor threshold voltage. This is at least partially because at larger nodes, timing margins simply aren't a significant portion of overall timing constraints. But relying on these library models becomes problematic for high-speed or high-performance designs and, particularly, designs at advanced nodes.

The number of timing paths in the circuit can be very large based on the number of nodes. The number of timing paths can further increase based on the number of multi-input and multi-output nodes (or circuit stages) present in the circuit. For example, for a single circuit stage with multiple inputs and multiple outputs, one timing path corresponds to each input-output combination of the circuit stage. These combined with paths through other multi-input multi-output circuit stages can exponentially increase the number of timing paths present in a circuit. In addition to the number of timing paths, STA analysis flow for a full-chip implementation requires analysis of the same netlist across various combinations of constraint modes, delay corners and library sets (e.g. "views"). The combinations of these can quickly yield hundreds of timing analysis views that need to be analyzed. Conventionally, users run analyses on these separate timing analysis views as individual separate runs in a process called Single Mode Single Corner (SMSC) timing analysis. This can be very time and resource consuming.

Jitter affects the clock delay of the circuit and the time the clock is available at sync points so, it is important to calculate its impact correctly to take appropriate margin during timing analysis. Jitter could be due to various reasons—one of them is the impact current-resistance (IR) drop on the clock tree. IR drop variations between two consecutive cycles of the clock tree can effectively reduce the available clock period for data to be correctly captured. Designers model this IR-drop induced jitter in STA analysis in either of the following ways: As a component of setup uncertainty or using a fixed jitter margin. Both of these approaches tend to add very pessimistic timing margins which do not accurately reflect actual IR-drop induced cycle-to-cycle jitter. There is therefore a need to solve these and other issues.

SUMMARY

The present embodiments relate generally to timing analysis, and more particularly to analyzing clock jitter using a delay calculation engine.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein:

FIG. 4 illustrates exemplary IR drop properties of an example system according to present embodiments.

FIG. 5 illustrates exemplary jitter properties of an example system according to present embodiments.

DETAILED DESCRIPTION

Figure 1:
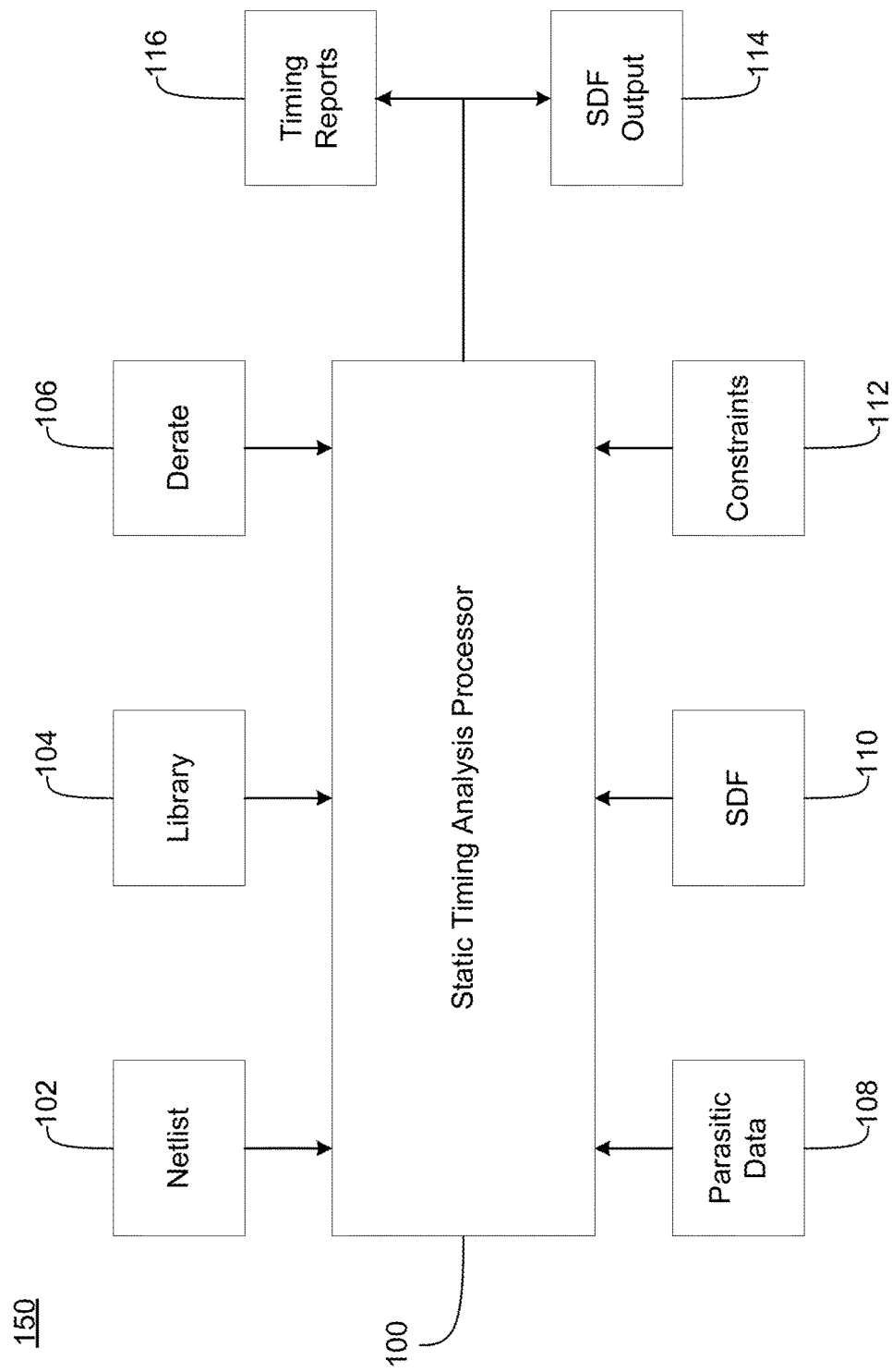
FIG. 1 illustrates a block diagram of an example system according to embodiments.

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

As set forth above, integrated circuits can be designed to include thousands to millions of components. Before a designed integrated circuit is signed-off for fabrication, the design is analyzed to verify that various circuit parameters such as timing and power meet the specified requirements. For example, the design can be analyzed to determine timing delays associated with various portions of the circuit, and to verify whether the delays meet required delay constraints. One example tool used for timing analysis is a static timing analysis (STA) tool. The STA tool can determine the timing delays without actually simulating the design. In particular, the STA tool can perform delay calculations of various portions of the design based on timing models without having to verify the functionality of the design. The delay calculations can provide an estimate of the delays along various paths within the design. A designer can compare the delays through various paths within the design to their respective required delays. Paths that have delays that are greater than their respective required delays can be identified as violating paths. The designer can modify or optimize various circuit components within the violating paths with the aim to reduce the delay associated with the violating paths. After optimization, the designer can re-run the STA to verify whether the optimizations improved the delays of the violating paths. This design process of STA analysis, design optimization, and verification of timings can be repeated until the designed integrated circuit meets the timing constraints, and the design can be signed-off.

FIG. 1 depicts an example block diagram of a system 150 according to embodiments.

As shown, system 150 can include a STA processor 100 that is configured to carry out static timing analysis (STA) on a circuit design. The STA processor 100 can receive as inputs a definition 102, delay library 104, derate information 106, parasitic data 108, standard delay format data 110, and constraints 112. The netlist definition 102 can include a model that defines a circuit that is to be analyzed. In particular, the netlist definition 102 can provide a description of the connectivity of various electronic components within the circuit. As an example, the netlist definition 102 can include a gate level description of the circuit design, which describes the connectivity of various logic gates within the circuit. The delay library 104 can include delay information associated with various standard gates (e.g., AND gate, OR gate, NAND gate, etc.), macros, and non-standard gates described in the netlist. In some instances, the delay information can include minimum and maximum delay associated with the gates. Derate information 106 specify derate factors associated with one or more components of the circuit. Derate factors can model the effects of varying operation conditions by adjusting delay values calculated for individual timing arcs associated with one or more components of the circuit. Parasitic data 108 can include capacitive, inductive, and electromagnetic coupling data associated with interconnects in the circuit. The parasitic data can be used to adjust delay values between circuit stages. Standard delay format data (SDF) 110 can include predefined delays for certain gates or interconnects in a standard format. Constraints 112 can include values of parameters against which the design can be evaluated. For example, the constraints can include required times for delays across gates, circuit paths, circuit modules, and input/output pairs, and other portions of the circuit.

In embodiments, the system 150 can be implemented by one or more general purpose computers that are loaded with software (e.g., EDA tools) and/or customized to include hardware for interactively implementing physical electronic designs. In some embodiments, the system can comprise one or more computing systems having various components not shown such as processor(s) or processor core(s), memory, disks, etc. The EDA software and/or custom hardware may further include interactive or automated modules such as a placer, a routing engine, a layout editor, a design rule checker, a verification engine, or a floorplanner, etc. as will be appreciated by those skilled in the art. In some embodiments, the one or more computing systems are implemented in a "cloud" configuration and/or a client/server configuration. For example, one or more server computers may be loaded with application software (e.g., a STA tool running on one or more virtual machines) for implementing some or all of the methodology of the present embodiments, and one or more client computers can communicate with the server computer(s) via a network to perform some or all of the methodology of the embodiments for a particular design. In operation, a user can interact with the STA tool via a user interface module to perform analyses on designs in accordance with methodologies to be described in more detail herein.

In operation, the STA processor 100 can take into consideration the above mentioned inputs and generate timing information for the circuit represented by the netlist 102. The STA processor 100 need not simulate the circuit described by the netlist 102 to determine the timing information. That is, the timing information can be independent of the data values being applied at input pins of the circuit. In some examples, the STA processor 100 can generate an SDF output 114, which include the delays determined for each gate within the netlist. The STA processor 100 also can generate timing reports 116, which can include timing characteristics of the circuit. For example, the timing reports 116 can identify the circuit paths and circuit stages that may violate the constraints 112 (such as required time). That is, the timing report 116 can identify circuit paths and circuit stages that have arrival times that are greater than their respective required times specified in the constraints 112. In some instances, where the circuit includes sequential logic in addition to combinatorial logic, the timing reports 116 may include a list of circuit paths that violate setup and hold times between any two sequential logic circuits. The setup and hold times may be specified by the constraints 112.

The STA processor 100 can generate the SDF output 114 and the timing reports 116 based on the STA approach discussed below in relation to FIGS. 2-5. The SDF output 114 and the timing reports can be used to update the timing of the netlist 102. It should be noted that the netlist 102 can include or be implemented by one or more computer-readable files (e.g., GDS II, OASIS, etc.) that describe the circuit layout containing physical locations and dimensions of the circuit's components, interconnections, and various layers from the design, in accordance with a target fabrication process. The one or more files can be provided by a fab so the design can be fabricated to create the integrated circuit. As is well known in the art, the designed integrated circuit can eventually be fabricated by lithography transferring or printing the circuit layout to a semiconductor substrate in a series of layers that collectively will form the features that constitute the devices that make up the components of the integrated circuit.

The STA processor 100 can view the netlist of the circuit as a directed acyclic timing graph, where pins/ports of circuit elements (such as logic gates or other circuit components) and/or the circuit elements can be considered as nodes of the timing graph, and interconnects between the nodes can be considered as edges of the timing graph. For example, a two input NAND gate circuit (which includes two input pins and one output pin) can include two nodes corresponding to the two input pins, one node corresponding to the NAND gate logic, and another node corresponding to the output pin. The interconnects connecting these nodes can be considered as edges. In another approach, (known as the pin node convention) each pin/port of the logic gate is considered as a node.

Regardless of the convention used to correspond circuit elements and interconnects to nodes and edges of the timing graph, the STA processor 100, based on the inputs, can assign delays to the nodes and the edges of the timing graph. For example, the STA processor 100 can assign delays to each of the two edges corresponding to the two input NAND gate, and assign a set of delays to the NAND gate logic. The set of delays assigned to the NAND gate logic represent the different delays of the gate logic based on the transitioning input, the direction of transition (rise or fall), and the resulting transition of the output. Where the netlist includes both combinatorial and sequential logic, the STA processor 100 can represent the netlist as a set of combinatorial blocks that lie between the sequential elements, and generate timing graphs for each of the combinatorial blocks.

FIGS. 2A-2E illustrate exemplary timing graphs during an example cycle of an example system according to present embodiments. In some embodiments, the system 150 may generate one or more of timing graphs 2A-2E. In some embodiments, the system 150 obtains one or more of timing graphs 200A representing an exemplary circuit, electronic system, electrical system, or the like, or a plurality thereof. The timing graphs 200A-E may include one or more nodes and edges, among other features. In some embodiments, the netlist 102 includes definitions of at least one of the timing graphs 200A-E.

In some embodiments, the timing graphs 200A-E include nodes 202, 212, 214, 216, 222, 232, 242, 244 and 246. Nodes in accordance with the nodes of any of timing graphs 2A-E may include one or more logical, electrical, or like components as are known or may become known. Nodes may include, but are not limited to, one or any combination of actual or ideal logical gates (e.g., AND, OR, NAND, XOR, and the like), actual or ideal logical devices (e.g., clocks, flip-flops, registers, multiplexers, demultiplexers, counters, accumulators, combinatorial logic block generally, and the like), and actual or ideal electrical or electronic devices (e.g., diodes, capacitors, inductors, transistors, voltage sources, current sources, and the like).

Nodes in accordance with the nodes of any of timing graphs 2A-E may include an arbitrary number of inputs and outputs. In some embodiments, nodes include one or more inputs and one or more outputs. Exemplary nodes may include zero, one, two or three inputs, as illustrated by way of example in FIG. 2A-E as nodes 202, 214, 242 and 222. A node with zero inputs may be considered a root node, at which a timing graph or timing analysis may begin. In some embodiments, a root node represents a clock device, and origin of a timing signal, or the like. A node with zero outputs may be considered an endpoint node, at which a timing graph or timing analysis may end. It is to be understood that neither a root node nor an endpoint node is limited to zero inputs or outputs, respectively, and may include one or more inputs or outputs, respectively, receiving or transmitting feedback, control, information, physical properties, or the like. In some embodiments, the delay library 104 includes definitions of the nodes 202, 212, 214, 216, 222, 232, 242, 244 and 246.

In some embodiments, the timing graphs 200A-E include edges 201A, 203A, 205A, 211A, 213A, 215A, 217A, 221A, 223A, 231A and 233A. Edges in accordance with any of the timing graphs 2A-E may be connected to any input or output of any node. In some embodiments, edges may define stage, groups, or the like including one or more various nodes, depending on the number of intervening nodes between an instant node and a root node. For example, the timing graphs 2A-E may include a root stage including root node 202, and an endpoint stage including endpoint nodes 242, 244, and 246. Exemplary timing graphs 2A-E may further include a first stage including nodes 212, 214 and 216 directly connected to root node 202 by edges 201A-E, 203A-E, and 205A-E. Exemplary timing graphs 2A-E may further include a second stage including node 222 connected indirectly to root node 202 by edges 211A-E, 213A-E, 215A-E connected respectively to nodes 212, 214, and 216. Exemplary timing graphs 2A-E may further include a third stage including node 232 indirectly connected to root node 202 by edge 223A-E connected to node 222. Finally, endpoint nodes 242, 244, and 246 of exemplary timing graphs 2A-E may be indirectly connected to root node 202 by edges 221A, 231A-E, and 233A-E connected respectively to nodes 222 and 232.

Each node and edge in the timing path can have an associated delay. For example, a node representing a gate logic can have an associated gate delay (or propagation delay), and edges representing interconnects can have associated wire delays or transition delays. A timing path may also represent a signal delay between the endpoints. For example, a timing path between a start and an endpoint can include signal delays of all nodes and edges between the two endpoints. The delays associated with the nodes and edges can correspond to gate delays and wire delays or transition delays of gates and interconnects between the two endpoints. The timing path may also be represented by a series of timing arcs, where each timing arc describes the timing relationship between an input pin and an output pin of a gate (e.g., a cell timing arc) or between an output pin and an input pin of an interconnect (e.g., a wire timing arc). Each timing arc can describe a delay across the timing arc as well as an unateness (positive, negative, or non-unate) of the timing arc. The STA processor 100 can utilize the timing arc information to determine delays associated with a timing path.

In some embodiments, the system 150 generates the timing graphs 200A-E at one particular cycle among a plurality of cycles of an example system. An example system in accordance with the present embodiments may operate in one or more sequential cycles in time, and the system 150 may generate timing graphs 200A-E with properties during a particular cycle among the one or more sequential cycles.

Figure 2A:
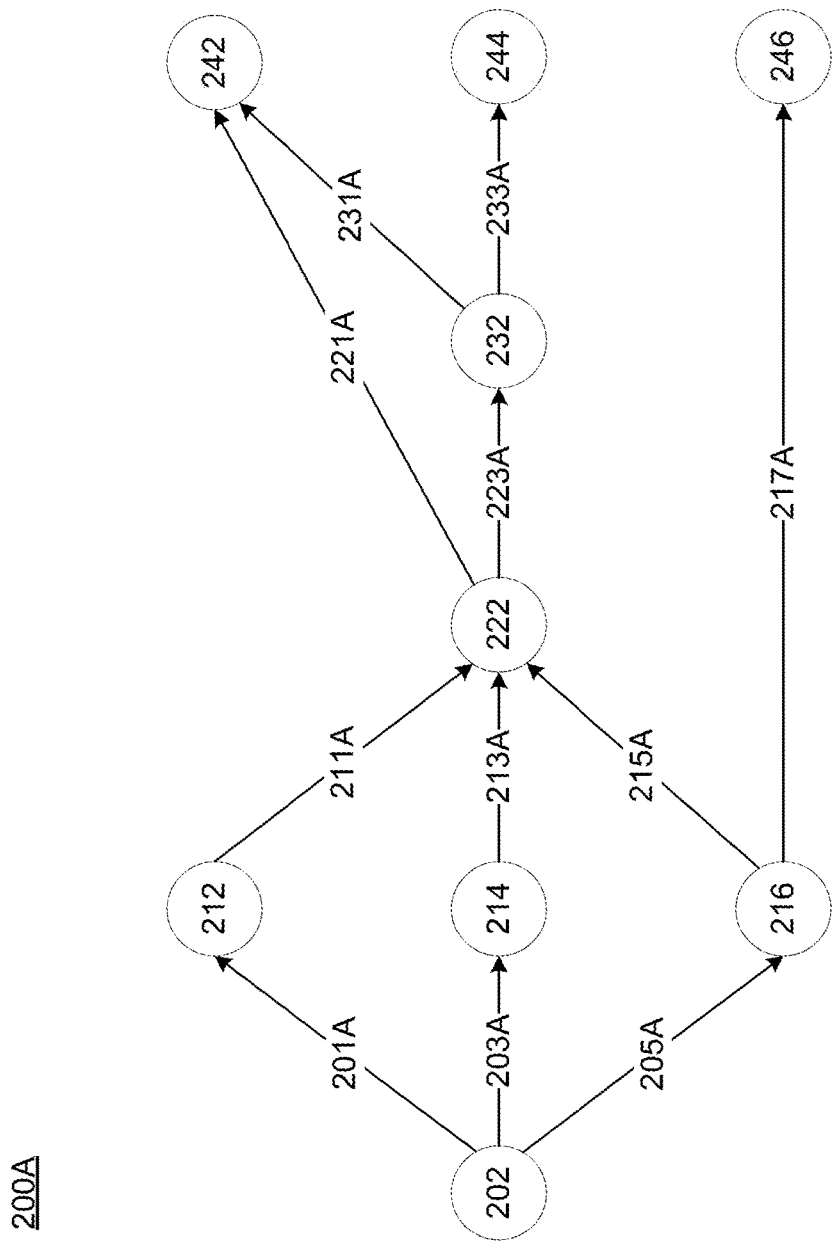
FIG. 2A illustrates a timing graph during an example cycle of an example system according to present embodiments.

FIG. 2A illustrates a timing graph during an example cycle of an example system according to present embodiments. In the exemplary timing graph 200A, the system 150 generates timing graph 200A based at least partially in view of the netlist 102. The exemplary timing diagram 200A includes edges 201A, 203A, 205A, 211A, 213A, 215A, 217A, 221A, 223A, 231A, and 233A, which lack path properties, IR drop properties, and time delay properties.

Figure 2B:
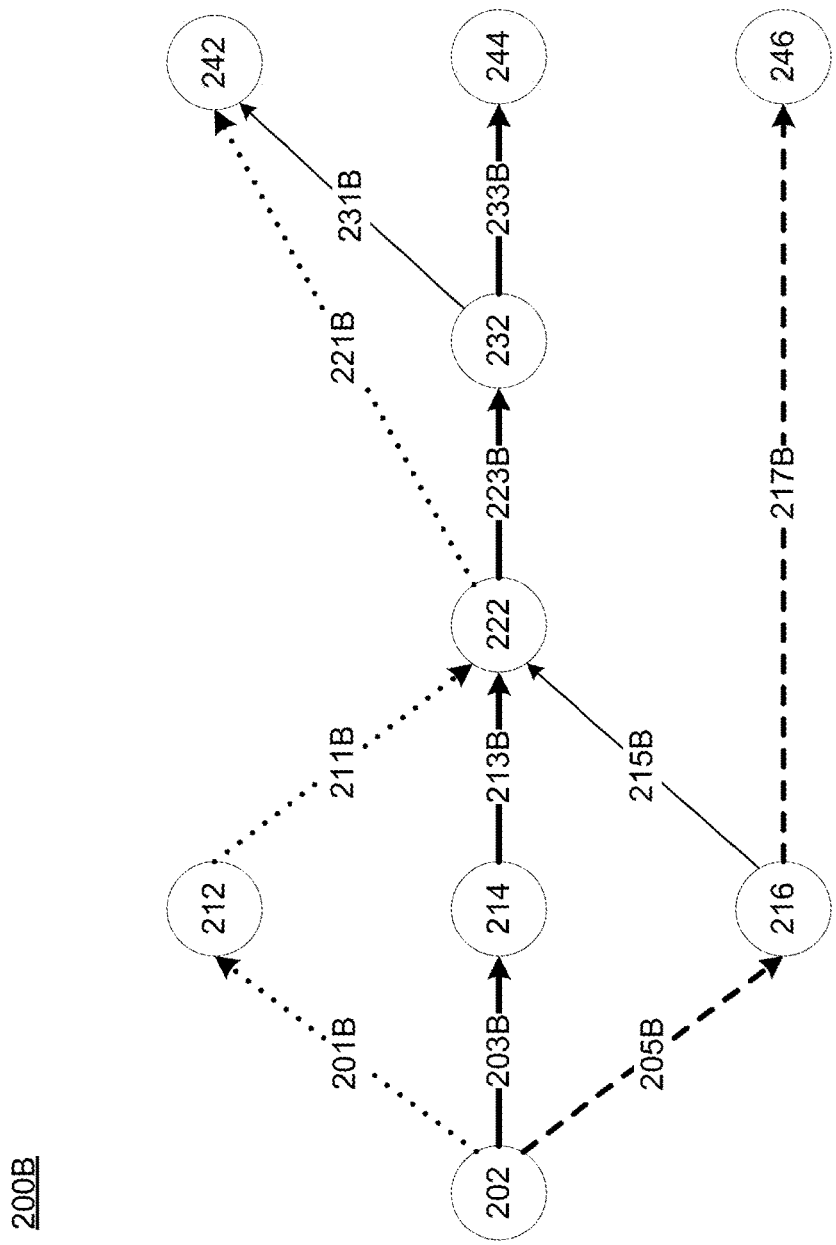
FIG. 2B illustrates a timing graph including timing path properties during an example cycle of an example system according to present embodiments.

FIG. 2B illustrates a timing graph including timing path properties during an example cycle of an example system according to present embodiments. In the exemplary timing graph 200B, the system 150 generates timing graph 200B at least partially by the STA processor 100. The exemplary timing diagram 200B includes edges 201B, 203B, 205B, 211B, 213B, 215C, 217B, 221B, 223B, 231B, and 233B, which include path properties, and lack IR drop properties and time delay properties.

As an example, a path on the timing graph between two points can represent a timing path. In the exemplary timing graph of 200B, the system 150 generates one or more paths from the root node 202 to one or more of the endpoint nodes 242, 244, and 246. The system 150 may generates an exemplary shortest path from the root node 202 to the endpoint node 246 through node 216 comprising edges 205B and 217B. The system 150 may further generate an exemplary longest path from the root node 202 to the endpoint node 244 through nodes 214, 222, and 232 comprising edges 203B 213B, 223B, and 233B. The 150 may further generate an exemplary intermediate-length path from root node 202 to endpoint node 242 through nodes 212 and 222 comprising edges 201B, 21B, and 221B.

In some embodiments, the system 150 generates one or more paths based at least in part on the netlist 102. A netlist, based on the size of the circuit it represents, can include a large number of timing paths. For example, large integrated circuits can have millions of timing paths. The STA processor 100 can also determine the timing paths based at least on the netlist 102 and the timing information provided by the library 104. It is to be understood that the system 150, in various embodiments, may generate additional or fewer paths among various edges, and may generate paths in which multiple paths share one or more edges. As one example, the system 150 may, in various embodiments, generate a path from root node 202 to endpoint node 242 comprising edges 205B, 215B and 221B. As another example, the system 150 may, in various embodiments, generate a path from root node 202 to endpoint node 242 comprising edges 203B, 213B, 223B, and 231B.

Figure 2C:
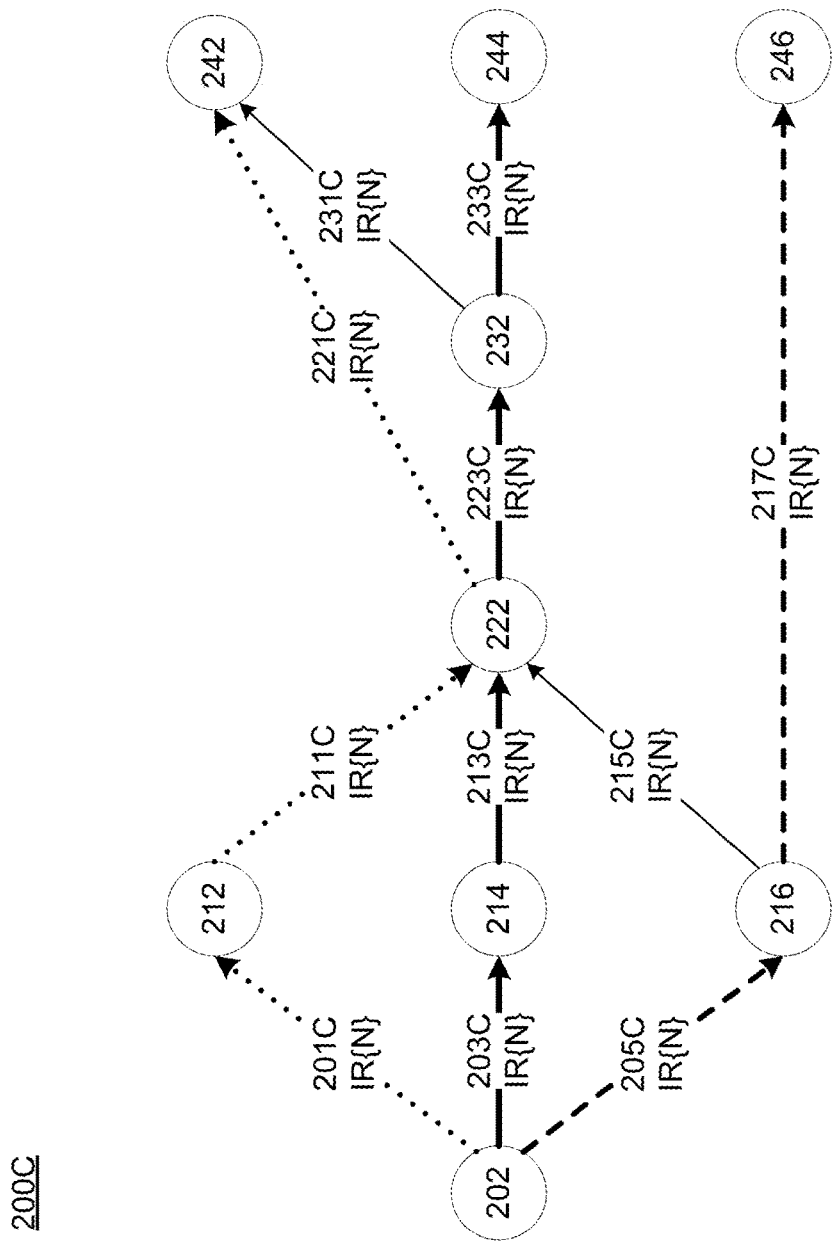
FIG. 2C illustrates a timing graph including generated IR drop properties during an example cycle of an example system according to present embodiments.

FIG. 2C illustrates a timing graph including generated IR drop properties during an example cycle of an example system according to present embodiments. The exemplary timing diagram 200C includes edges 201C, 203C, 205C, 211C, 213C, 215C, 217C, 221C, 223C, 231C, and 233C, which include path properties and IR drop properties IR{N}, and lack time delay properties. In the exemplary timing graph 200C, the system 150 generates one or more of the it drop properties IR{N} at least partially by the STA processor 100.

In some embodiments, the system 150 generates an effective instance voltage ("EIV") for one or more of the edges 201C, 203C, 205C, 211C, 213C, 215C, 217C, 221C, 223C, 231C and 233C of timing graph 200C during cycle N. The EIV may be defined as, for example, a power supply voltage minus an IR drop of power and minus an IR drop of ground. In some embodiments, the EIV may comprise a root mean square voltage ("Vrms") of any portion of any timing graph in accordance with the present embodiments. The system 150 may, by way of example, generate at least one exemplary IR drop property IR{N} corresponding to each edge of the timing graph 200C. In some embodiments, the system 150 aggregates, sums, combines, or conducts a like operation for edges along one or more paths to generate aggregate IR drop properties IR{N} corresponding to those one or more paths. For example, the system 150 may generate an aggregate IR drop from the root node 202 to the endpoint node 244 comprising IR drop properties IR{N} for the edges 203C, 213C, 223C and 233C. It is to be understood that system 150 may generate aggregate IR drop properties for any path through the timing graph 200C, or any timing graph in accordance with the present embodiments.

Figure 2D:
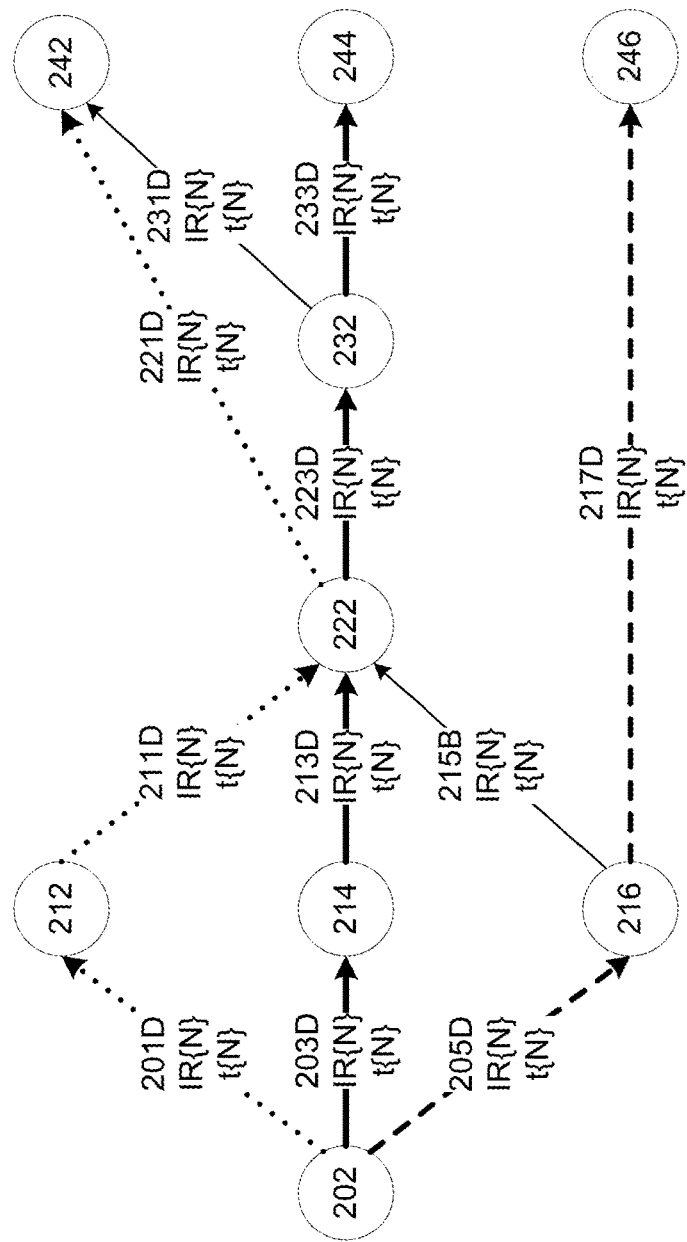
FIG. 2D illustrates a timing graph including generated time delay properties during an example cycle of an example system according to present embodiments.

FIG. 2D illustrates a timing graph including generated time delay properties during an example cycle of an example system according to present embodiments. The exemplary timing diagram 200D includes edges 201D, 203D, 205D, 211D, 213D, 215D, 217D, 221D, 223D, 231D, and 233D, which include path properties, IR drop properties IR{N}, and time delay properties t{N}. In the exemplary timing graph 200D, the system 150 generates one or more of the time delay properties t{N} based at least partially in view of the delay library 104.

In some embodiments, the system 150 generates a time delay t{N} for one or more of the edges 201D, 203D, 205D, 211D, 213D, 215D, 217D, 221D, 223D, 231D and 233D of timing graph 200D during cycle N. In some embodiments, time delay may be generated to correspond to one input of a particular node from one output of another node. In some embodiments, time delay may be measured in picoseconds (ps), microsecond (μs), or the like. In some embodiments, time delay may be a function of electrical, electromechanical or mechanical, electromagnetic, magnetic, electrochemical, chemical, or like property, or any combination therefor. Time delay properties may include, but are not limited to, resistance, capacitance, inductance, caused by electrical, magnetic, temperature, or like influence or effect. The system 150 may generate time delay properties at least in part based on one or more of the derate information 106, the parasitic data 108, the SDF 110 and the constraints 112.

Figure 2E:
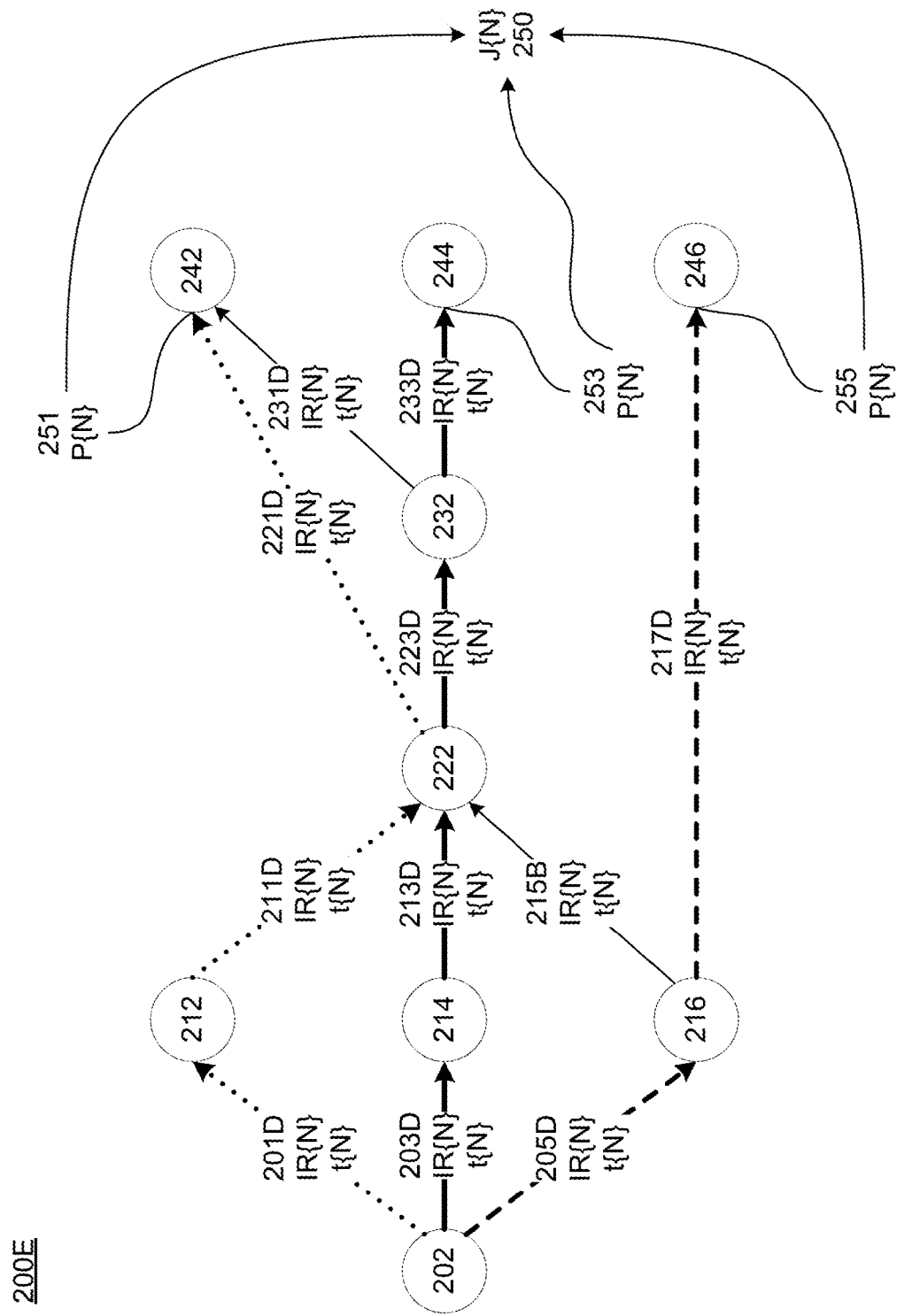
FIG. 2E illustrates a timing graph including generated jitter properties during an example cycle of an example system according to present embodiments.

FIG. 2E illustrates a timing graph including generated jitter properties during an example cycle of an example system according to present embodiments. The exemplary timing diagram 200E includes endpoint path delay properties P{N} 251, 253 and 255 corresponding to various exemplary paths through the timing graph 200E. The exemplary timing diagram 200E further includes at least one cycle jitter property J{N} 250 based at least in part on one or more of the path delay properties P{N} 251, 253, and 255. In the exemplary timing graph 200E, the system 150 generates one or more of the endpoint path delay properties P{N} and the cycle jitter property J{N} at least partially by the STA processor 100.

In some embodiments, the system 150 generates one or more endpoint path delay properties P{N} for one or more paths between a root node and an endpoint of a timing graph. By way of example, the system 150 generates jitter properties 251, 253 and 25 respectively corresponding to distinct paths through the timing graph 200E. As a first example, the jitter property 251 corresponds to a path from the root node 202 to the endpoint node 242 comprising the edges 201D, 211D and 221D. As a second example, the jitter property 253 corresponds to a path from the root node 202 to the endpoint node 244 comprising the edges 203D, 213D, 223D and 233D. As a third example, the jitter property 255 corresponds to a path from the root node 202 to the endpoint node 246 comprising the edges 205D and 217D. The system 150 may, in some embodiments, generate additional paths and generate additional jitter properties for those paths from one or more root nodes to one or more endpoints nodes. The system 150 may also generate distinct jitter properties for paths comprising one or more shared nodes and comprising one or more node not shared among any other individual path, or group or subset of paths. It is to be understood that the system 150 and any system or method in accordance with the present embodiments is not limited to these exemplary paths.

Figure 3:
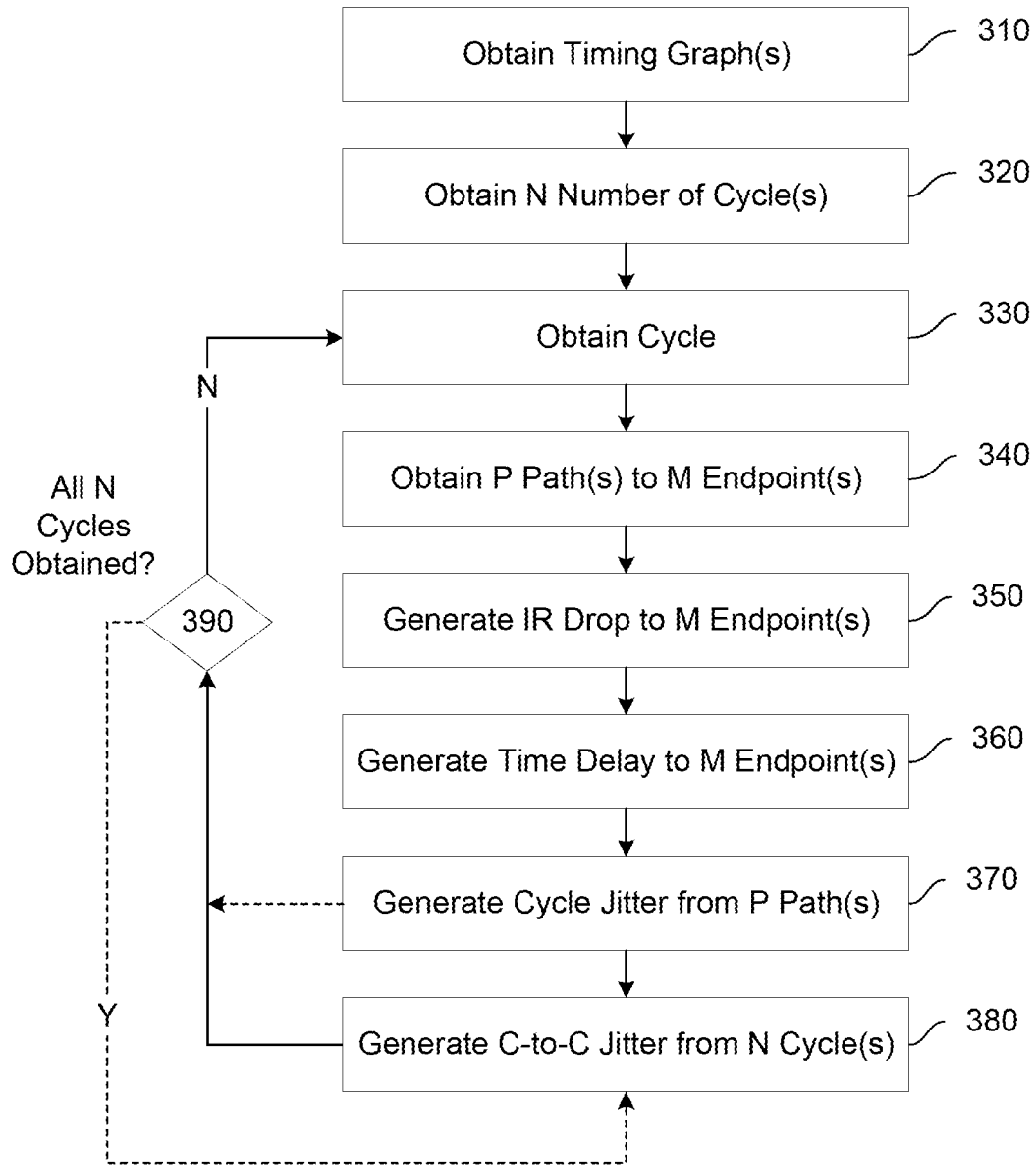
FIG. 3 illustrates an exemplary method of analyzing clock jitter according to present embodiments.

FIG. 3 illustrates an exemplary method of analyzing clock jitter according to present embodiments. In some embodiments, the system 150 or an exemplary system in accordance with the present embodiments, performs method 300 according to the present embodiments.

At step 310, an exemplary system obtains one or mode timing graphs. In some embodiments, the system 150 may obtain timing graph 2A at least in part in view of netlist 102. As discussed above with respect to FIG. 2A, the exemplary timing graph 2A includes one root node, a plurality of edges, a plurality of endpoint nodes, and a plurality of internal nodes in addition to the root node and the endpoint nodes. In some embodiments, the exemplary system identifies one or more endpoint nodes and one or more root nodes. It is to be understood that an exemplary system may obtain a timing graph with any number of root nodes, endpoint nodes, edges, and internal nodes in any configuration. The exemplary system may generate, load, reconstruct, decrypt or the like to obtain the timing graph. The method 300 then continues to step 320.

At step 320, an exemplary system obtains one or more cycles, or a numeric value representing a number of cycles. In some embodiments, system 150 obtains a number of cycles through which a timing graph may run. The system 150 generally, and the STA processor 100 specifically, may generate a plurality of sequential timing graph states based on various input or state changes to one or more nodes or edges of the timing graph. As a first example, a timing graph may represent an electronic system responsive to digital, analog, environmental, or like input at one more nodes. As a second example, the timing graph may represent an electronic system operable in one or more steady states including feedback from an internal or endpoint node to a root node or another internal node. It is to be understood that nodes may take many forms as discussed above with respect to FIGS. 2A-E, and that one, more, or no nodes may change state temporarily or permanently in any one cycle or over a plurality of cycles. By obtaining a number of cycles, an exemplary system may iterate over a number of cycles as in a logical "for" loop until a predetermined number of cycles have elapsed, (e.g., "N" cycles), in a "while" loop until a predetermined condition is met (e.g., lack of change in state over time), or a combination thereof. The method 300 then continues to step 330.

At step 330, an exemplary system obtains a cycle from the one or more cycles obtained in step 320. The system 150 may, for example, generate an initial state of a timing graph at a first or initial time (e.g., where N=0), based on an obtained timing graph. Where the system 150 iterates through a plurality of cycles, the system 150 may generate a current cycle from either an initial state at the initial time, or may generate the current state from the preceding state or states. The method 300 then continues to step 340.

At step 340, an exemplary system obtains one or more paths to one or more endpoint nodes. In some embodiments, the system 150 may generate one or more paths in a timing graph during a particular cycle {N} as illustrated by way of example in timing graph 200B of FIG. 2B. The method 300 then continues to step 350.

At step 350, an exemplary system generates IR drop to one or more endpoints. In some embodiments, the system 150 may generate one or more IR drop properties IR{N} in a timing graph during a particular cycle {N} as illustrated by way of example in timing graph 200C of FIG. 2C. The method 300 then continues to step 360.

At step 360, an exemplary system generates time delay to one or more endpoints. In some embodiments, the system 150 may generate one or more time delay properties t{N} in a timing graph during a particular cycle {N} as illustrated by way of example in timing graph 200D of FIG. 2D. The method 300 then continues to step 370.

At step 370, an exemplary system generates cycle jitter corresponding to the current cycle from one or more paths to one or more endpoint nodes. In some embodiments, the system 150 may generate one or more endpoint path delay properties P{N} in a timing graph during a particular cycle {N} as illustrated by way of example in timing graph 200E of FIG. 2E. In some embodiments, a cycle jitter property is based on one or more endpoint path delay properties P{N} for one or more paths from a root node to an endpoint node. In some embodiments, a path delay property is based on an aggregate, sum, combination, or like function taking as input at least one IR drop property IR{N} and at least one timing delay property t{N} of one or more edges of a particular path. In some embodiments, the system 150 may compare a plurality of path delay properties P{N} 251, 253 and 255, and select the path delay property with the greatest magnitude as the cycle jitter property J{N} 250. The magnitude of the cycle property may be a positive or a negative value, or may be an absolute value. In some embodiments, an exemplary system stores, references, or associates the cycle jitter property J{N} with the cycle {N} of an exemplary timing diagram. As one example, the system 150 may compare the path delay properties P{N} 251, 253 and 255, may determine that the path delay property P{N} 251 has the greatest comparative magnitude, and may store the value of the path delay property P{N} 251 as the value of the cycle jitter property J{N} 250 for the timing graph 2E representing a state of the timing graph during cycle {N}. As a first example, the system 150 may compare signed values, resulting in a magnitude selection of the cycle jitter property J{N} 250 based on either the greatest positive value or the greatest negative value. As a second example, the system 150 may compare absolute values, resulting in a magnitude selection of the cycle jitter property J{N} 250 independent of sign direction. The method 300 then continues to step 380.

At step 380, an exemplary system generates cycle-to-cycle jitter corresponding to all obtained cycles or a number of obtained cycles. In some embodiments, the system 150 generates a cycle-to-cycle jitter property based on cycle jitter properties during all cycles from {0} or {1} to or through {N}. In some embodiments, the system 150 sets a current cycle-to-cycle jitter property C{J{0}-J{N}} to an initial or default value including, for example {0}, {NULL} or the like, or to a predetermined value representative of an average, historical, or like extrinsic jitter property. In some embodiments, the system 150 iteratively compares the current cycle-to-cycle jitter property C{J{0}-J{N}} to the cycle jitter property J{N} for a particular cycle {N}. If the cycle jitter property J{N} for cycle {N} has a greater magnitude than that of the cycle-to-cycle jitter property, then the system 150 may set the cycle-to-cycle jitter property C{J{0}-J{N}} to that of the current cycle jitter property J{N}. In some embodiments, the cycle jitter property J{N} corresponds to a latency of a cycle, and the cycle-to-cycle jitter property C{J{0}-J{N}} corresponds to an endpoint cycle-to-cycle jitter. In some embodiments, an endpoint cycle-to-cycle jitter may equal a difference between latency of a cycle N+1 and latency of a preceding cycle N. Thus, in various embodiments, the cycle-to-cycle jitter property C{J{0}-J{N}} represents the longest delay from a root node to an endpoint node for a timing diagram over a number of cycles. It is understood that the system 150 may comprise more than one cycle jitter property J{N} and more than one cycle-to-cycle jitter property C{J{0}-J{N}} in accordance with the present embodiments. For example, the system 150 may generate positive, negative, and absolute value variants of both the cycle jitter property J{N} and the cycle-to-cycle jitter property C{J{0}-J{N}}.

At step 390, an exemplary system determines whether all cycles have been obtained, or a number of cycles corresponding to a predetermined number of cycles has been obtained. If the exemplary system determines affirmatively, then the method 300 optionally continues to step 380, in which the system 150 may make a final comparison between the cycle-to-cycle jitter property C{J{0}-J{N}} and the cycle jitter property J{N} associated with a final cycle of the timing graph 2A-E. Otherwise, the method continues to step 330, in which the system 150 may obtain a subsequent or additional non-sequential cycle of the timing graph 2A-E.

Alternatively, the system 150 may collect cycle jitter J{N} properties for a plurality of cycles {0}-{N} iteratively without iteratively comparing each cycle jitter property J{N} to the cycle-to-cycle jitter property C{J{0}-J{N}}. In this exemplary embodiment, the method 300 may continue from step 370 to step 390 directly or without continuing to step 380 during an intervening step. In this exemplary embodiment, the method 300 may continue to step 390 after an affirmative determination at step 390. The method 300 may then perform step 380 by at least comparing all or substantially all collected cycle jitter properties generated at step 370 and generating the cycle-to-cycle jitter property C{J{0}-J{N}} by at least determining the cycle jitter property {N} having the greatest magnitude based on all or substantially all of the collected cycle jitter properties. Thus, the method 300 may, in this exemplary embodiment, iteratively perform step 370 and non-iteratively perform step 380 after an affirmative determination at step 390.

FIG. 4 illustrates exemplary IR drop properties of an example system according to present embodiments. In some embodiments, the system 150 generates exemplary IR drop properties IR{N} representing respective EIV properties for one or more cycles as EIV report 400. In some embodiments, the system 150 may generate, maintain, or store the EIV report 400 among the timing reports 116 of the system 150. It is to be understood that the EIV report 400 may be one of a plurality of complete or partial reports among the timing reports 116.

In some embodiments, the EIV report 400 includes a plurality of instance rows 410, each representing EIV properties associated with a respective instance. In some embodiments, an instance includes one or more node, edge, or combination thereof. The exemplary report 400 includes a plurality of cycle columns 420, 430, 440, 450 and 460. By way of example, each of the cycle columns further include a start time column 422, 432, 442, 452 and 462, an end time column 424, 434, 444, 454 and 464, and an EIV property value column 426, 436, 446, 456 and 466. A time difference between a start time and an end time associated with an instance may correspond to a time delay property t{N} associated with an edge as illustrated by way of example in FIGS. 2D and 2E. It is to be understood that the EIV report 400 may take any form in which all, substantially all, or a substantial portion of the information or structure of information therein may be represented.

FIG. 5 illustrates exemplary jitter properties of an example system according to present embodiments. In some embodiments, the system 150 generates exemplary cycle-to-cycle jitter properties C{J{0}-J{N}} and cycle jitter properties J{N} as jitter report 500. In some embodiments, the system 150 may generate, maintain, or store the jitter report 500 among the timing reports 116 of the system 150. It is to be understood that the jitter report 500 may be one of a plurality of complete or partial reports among the timing reports 116.

In some embodiments, the jitter report 500 includes a jitter summary report 510 and a jitter-per-endpoint report 520. The exemplary jitter summary report 510 of exemplary jitter report 500 includes a clock summary column 512, a cycle-to-cycle jitter summary column 514, and a total endpoint (or "end points") column 516. The exemplary clock summary column 512 includes a list of all or substantially all root clocks in an exemplary timing graph upon which the jitter report 500 is based. Root clocks may, in various embodiments, correspond to one or more root nodes in accordance with FIGS. 2A-E. The cycle-to-cycle jitter summary column 514 includes one row for each root clock including a maximum negative jitter property value and a maximum positive jitter property value associated with a respective one of the root clocks for a particular cycle. The total endpoints column 516 includes one row for each root clock including a total number of nodes associated with a respective one of the root clocks for a plurality of cycles.

The exemplary jitter-per-endpoint report 520 include a clock detail column 522, an endpoints (or "end points") column 524, a cycle jitter column 526, and a cycle-to-cycle jitter column 528. The endpoints column 524 includes one row for each endpoint associated with a respective root clock. The clock detail column 524 includes one row for each root clock associated with a respective endpoint in column 524. The cycle jitter column 526 includes one row for each endpoint including a maximum negative jitter property value and a maximum positive jitter property value associated with a respective one of the endpoints for a particular cycle. The cycle-to-cycle jitter column 528 includes one row for each endpoint including a maximum negative jitter property value and a maximum positive jitter property value associated with a respective one of the endpoints for a plurality of cycles. It is to be understood that the report 500 may take any form in which all, substantially all, or a substantial portion of the information or structure of information therein may be represented.

Although the present embodiments have been particularly described with reference to preferred examples thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A method comprising:
at a static timing analysis device including a processor, and a non-transitory memory:
obtaining at least one root node, a plurality of endpoint nodes, and a plurality of edges connected to the root node and at least one of the endpoint nodes, each of the root node, the endpoint nodes, and the edges including at least one physical property;
generating a plurality of paths from the root node to the endpoint node through at least one of the edges;
generating a plurality of cycle jitter properties respectively associated with each of the paths; and
generating at least one cycle-to-cycle jitter property based on at least one of the cycle jitter properties.

2. The method of claim 1, wherein the generating the cycle jitter properties further comprises generating the cycle jitter properties respectively associated with each of the paths and based on respective ones of a plurality of effective voltage properties and a plurality of time delay properties associated with each of the paths.

3. The method of claim 2, wherein the generating the cycle jitter properties respectively associated with each of the paths further comprises generating one or more path effective voltage properties associated with a respective one of the paths, based at least in part on one or more of the effective voltage properties.

4. The method of claim 3, wherein the path effective voltage properties are based on at least one physical property associated with at least one of the root node, one or more of the endpoint nodes, and one or more of the edges associated with each of the paths.

5. The method of claim 2, wherein the generating the cycle jitter properties respectively associated with each of the paths further comprises generating one or more path time delay properties associated with a respective one of the paths, based at least in part on one or more of the time delay properties.

6. The method of claim 5, wherein the path time delay properties are based on at least one physical property associated with at least one of the root node, one or more of the endpoint nodes, and one or more of the edges associated with each of the paths.

7. The method of claim 1, wherein the generating the plurality of paths further comprises generating a plurality of paths during a plurality of time cycles, and wherein the generating the at least one cycle-to-cycle jitter property includes generating the cycle-to-cycle jitter property based on a plurality of cycle jitter properties respectively associated with the plurality of paths during the plurality of time cycles.

8. The method of claim 1, wherein the at least one physical property comprises at least one of an electrical voltage, an electrical current, an electrical resistance, an electrical inductance, and an electrical capacitance.

9. The method of claim 1, wherein the obtaining further comprises obtaining a timing graph comprising the root node, at least one of the endpoint nodes, and at least one of the edges.

10. A static timing analysis device comprising:
a static timing analysis processor;
a non-transitory memory including a library component, a netlist component, and an output component, and operatively coupled to the static timing analysis processor;
a library component including at least one root node, a plurality of endpoint nodes, and a plurality of edges connected to the root node and at least one of the endpoint nodes, each of the root node, the endpoint nodes, and the edges including at least one physical property;
a netlist component including a plurality of paths from the root node to the endpoint node through at least one of the edges; and
an output component including a plurality of cycle jitter properties respectively associated with each of the paths, and at least one cycle-to-cycle jitter property based on at least one of the cycle jitter properties.

11. The static timing analysis device of claim 10, wherein the cycle jitter properties further comprise cycle jitter properties respectively associated with each of the paths and based on respective ones of a plurality of effective voltage properties and a plurality of time delay properties associated with each of the paths.

12. The static timing analysis device of claim 11, wherein the cycle jitter properties respectively associated with each of the paths further comprise one or more path time delay properties associated with a respective one of the paths, based at least in part on one or more of the time delay properties.

13. The static timing analysis device of claim 12, wherein the path time delay properties are based on at least one physical property associated with at least one of the root node, one or more of the endpoint nodes, and one or more of the edges associated with each of the paths.

14. The static timing analysis device of claim 10, wherein the cycle jitter properties respectively associated with each of the paths further comprise one or more path effective voltage properties associated with a respective one of the paths, based at least in part on one or more of the effective voltage properties.

15. The static timing analysis device of claim 14, wherein the path effective voltage properties are based on at least one physical property associated with at least one of the root node, one or more of the endpoint nodes, and one or more of the edges associated with each of the paths.

16. The static timing analysis device of claim 10, wherein the plurality of paths further comprise a plurality of paths associated with a plurality of time cycles, and wherein the at least one cycle-to-cycle jitter property is based on a plurality of cycle-to-cycle jitter properties respectively associated with the plurality of paths associated with the plurality of time cycles.

17. The static timing analysis device of claim 10, wherein the at least one physical property comprises at least one of an electrical voltage, an electrical current, an electrical resistance, an electrical inductance, and an electrical capacitance.

18. The method of claim 10, wherein the netlist component further comprises a timing graph comprising the root node, at least one of the endpoint nodes, and at least one of the edges.

19. A non-transitory computer-readable medium including one or more instructions that when executed by one or more processors are operable to perform a method, the method comprising:

obtaining at least one root node, a plurality of endpoint nodes, and a plurality of edges connected to the root node and at least one of the endpoint nodes, each of the root node, the endpoint nodes, and the edges including at least one physical property;

generating a plurality of paths from the root node to the endpoint node through at least one of the edges;

generating a plurality of cycle jitter properties respectively associated with each of the paths; and generating at least one cycle-to-cycle jitter property based on at least one of the cycle jitter properties.

20. The non-transitory computer-readable medium of claim 19, wherein the generating the cycle jitter properties further comprises generating the cycle jitter properties respectively associated with each of the paths and based on respective ones of a plurality of effective voltage properties and a plurality of time delay properties associated with each of the paths.

* * * * *